United States Patent [19]

Ashizawa et al.

[11] 4,328,050
[45] May 4, 1982

[54] METHOD OF CONTROLLING AN OPERATION OF A COPY-CUTTING APPARATUS

[75] Inventors: Takeshi Ashizawa, Tokyo; Motoaki Yasumura, Kawagoe, both of Japan

[73] Assignee: Kabushiki Kaisha Tanaka Seisakusho, Tokyo, Japan

[21] Appl. No.: 102,515

[22] Filed: Dec. 11, 1979

[30] Foreign Application Priority Data

Dec. 11, 1978 [JP] Japan .............................. 53-152039

[51] Int. Cl.³ ......................... B23K 7/02; G05B 19/42
[52] U.S. Cl. ..................................... 148/9 R; 82/2 B;
82/14 B; 82/14 C; 83/71; 219/124.34;
219/125.11; 266/58; 266/60; 318/568; 318/577;
409/93; 409/121
[58] Field of Search ................... 148/9 R; 266/58, 59,
266/60; 219/124.34, 125.1, 125.11; 318/568,
577, 578; 83/925 CC, 71; 409/93, 96, 99, 106,
121; 144/144 R; 364/475; 82/2 B, 14 B, 14 C

[56] References Cited

U.S. PATENT DOCUMENTS

| | | | |
|---|---|---|---|
| 3,774,098 | 11/1973 | Moss | 318/568 |
| 3,828,318 | 8/1974 | Bennett et al. | 340/172.5 |
| 3,860,862 | 1/1975 | Dell et al. | 318/568 |
| 4,224,670 | 9/1980 | Yamazaki | 364/474 |

Primary Examiner—Delbert E. Gantz
Assistant Examiner—William Leader
Attorney, Agent, or Firm—Sughrue, Mion, Zinn, Macpeak and Seas

[57] ABSTRACT

A method of controlling an operation of a copy-cutting apparatus including a tracer for tracing automatically a pattern and a cutting gas torch interconnected to the tracer in a given relationship. Prior to the actual working, the tracer is manually moved with respect to the pattern along a given path and stores coordinates of operational points such as a piercing point, a copy start point, a copy end point, an intermediate point, a slow down point, etc. During the actual working the stored coordinates are read out to control the movement of the tracer in such a manner that until the tracer has reached a copy start point the copying apparatus is set in a position setting mode in which the tracer is moved under the control of the read out coordinates. After the tracer has reached the copy start point the copying apparatus is switched into a copying mode in which the movement of tracer along the pattern is controlled by detecting the pattern.

10 Claims, 9 Drawing Figures

METHOD OF CONTROLLING AN OPERATION OF A COPY-CUTTING APPARATUS

BACKGROUND OF THE INVENTION

The present invention relates generally to a copying system comprising a tracer for tracing automatically a contour of a pattern to be traced and a working machine for effecting a given working for an object with a working head being moved in conjunction with the tracer with a given relationship. More particularly it relates to a method for controlling an operation of the copying apparatus and an apparatus for carrying out the method.

As an example of such a copying apparatus a copy-gas cutting apparatus has been known, the device comprises a tracer for tracing automatically a contour of a pattern described on a template and a gas torch assembly having at least one blowpipe for jetting a cutting oxygen flow against an object such as a steel plate. In operation the steel plate is cut by the oxygen flow from the torch, while the tracer follows the pattern on the template in a mechanically contacting or photoelectrically non-contacting manner. In this manner an article or workpiece having the same shape as the pattern of template can be automatically cut out of the steel plate.

In the case of working the object, i.e. the steel plate with such a copy gas-cutting apparatus, the tracer is at first positioned manually at a point which is slightly remote from the pattern on the template and the gas torch assembly is operated to form a hole in the steel plate. This operation is sometimes referred as piercing. Then the tracer is manually moved from the piercing point to a copy start point on the pattern, while the oxygen gas flow is ejected from the torch, i.e. the cutting operation is continued. After that the tracer traces automatically the template and the steel plate is cut accordingly. When the tracer reaches a tracing end point, the ejection of cutting oxygen flow is stopped and then the tracer is removed from the template. In the known copying apparatus an operator must stay always near the apparatus to control manually the movement of the tracer and the operation of the gas torch. Therefore the known operation is very cumbersome and working efficiency is very low. Particularly in the case of effecting a series of operations with using a plurality of patterns after the operation for a pattern has been finished, the operator has to move the tracer to a next pattern. Such treatment is quite hard to manage.

In order to obviate the above mentioned drawback there has been devised a copying apparatus in which a tracer follows automatically from an end point of a pattern on a template to a start point of a next pattern along a guide line described on the template. In this case it is necessary to prepare special templates on which guide lines have been described and thus ordinary templates which have been used heretofore could not be utilized. Since the template requires a very high accuracy the upmost care should be taken in manufacturing the same. Therefore its process is quite complicated and results in high cost. Further in actual operation it is sometimes undesirable to predetermine the piercing points, start points and end points in accordance with the shape and material of objects to be worked, shape of pattern, arrangement of patterns in case of using a plurality patterns. In such a case the template having the guide line previously described thereon could not be used and the operator must move the tracer manually or a new template having a new guide line described thereon has to be prepared. In either cases the working efficiency becomes lower to a great extent.

Further there has been developed a so-called numerical control system in which position of the working machine with respect to the object are previously set as numerical values which are then stored in a memory as a given program. The movement and operation of the working machine are controlled in accordance with the numerical data readout from the memory. It is apparent that such a numerical control system is very complicated in construction and expensive. Moreover the operation of the machine is exclusively controlled in accordance with the previously determined program and thus could not be changed upon the actual working and lacks flexibility. In other words the piercing points, start and end points of copying, etc. could not be simply changed in accordance with the shape and material of object, the shape of the pattern and arrangement of patterns. In practice, the numerical control system is quite inconvenient for effectuating particular operations.

Upon operating the known copying apparatus the operator has to control or command the operation of the working machine as well as the movement of the working machine into given positions. For instance, in the copy gas-cutting machine after the tracer has been moved into a piercing point the gas torch is rendered operative to produce a jet of cutting oxygen by operating a suitable member on a control panel. When the tracer has reached a copy end point the oxygen flow is stopped and the tracer is moved into a next piercing point. Then the cutting oxygen gas flow is again jetted from the gas torch. The above mentioned operation is rather cumbersome and results in a decrease in operation efficiency. In the numerical control system these operational functions of the working machine can be previously stored in a memory, and during the working the operational function of working machine can be controlled by reading out the command signals from the store. However as described above the numerical control system is very complicated and expensive and further the flexibility is lacking.

SUMMARY OF THE INVENTION

In the present invention a primary object is to provide a method of controlling the movement of the tracer of a copying apparatus, in which use may be made of usual templates although the tracer need not be moved manually during an actual working.

It is another object of the invention to provide a method of controlling a movement of a tracer of a copying apparatus, which can be carried out in a simple and economical manner.

It is still another object of the invention to provide a method of controlling a movement of a tracer of a copying apparatus, in which operational points such as piercing points and copy start and end points can be preset prior to an actual working in a very simple manner in accordance with shape and material of objects, shape and arrangement of patterns to be traced.

It is still another object of the invention to provide a method of controlling a movement and operation of a copying apparatus, in which operational functions of a working machine at respective operational points can be automatically controlled by means of a simple and inexpensive manner.

It is still another object of the invention to provide a method of controlling the movement and operation of a copying apparatus, in which the amount of instructions about the operational functions of the apparatus to be stored in a memory can be reduced so as to make simpler the storing operation and smaller the capacity of the memory.

The present invention also relates to an apparatus for controlling the operation of a copying apparatus and has as an additional object to provide a novel and improved controlling apparatus which has a simple construction.

According to the invention a method of controlling a copying apparatus includes a tracer for tracing automatically a contour of a pattern to be copied and a working machine for effectuating a given working operation for an object to be worked upon being moved in conjunction with the tracer in a given relationship. The method comprises;

prior to an actual working,
a step for moving manually the tracer with respect to the pattern along a desired path to detect coordinates of the tracer at respective operational points such as a piercing point, a copy start point, a copy end point and the like and storing the coordinates in a memory; and during an actual working operation,
a step for reading the stored coordinates out of the memory to generate a signal for controlling automatically the movement of tracer.

DESCRIPTION OF THE PREFERRED EMBODIMENTS

Figure 1:
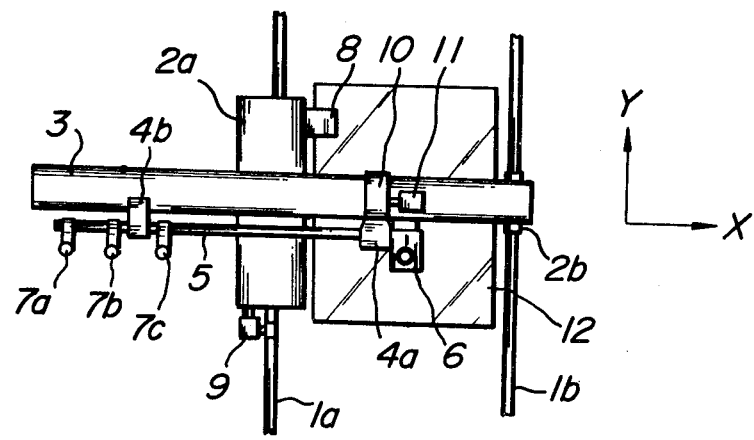
FIG. 1 is a plan view showing an embodiment of a gas cutting copying machine to which the control system according to the invention is applied.

FIG. 1 is a plan view showing an embodiment of a copy gas-cutting apparatus an operation of which is to be controlled by the method according to the invention. The entire apparatus rides on a pair of rails 1a and 1b. A direction along which the rails extend is denoted as the Y-direction and a direction perpendicular to the Y-direction as the X-direction. The apparatus comprises a main frame 2a and a subframe 2b on the bottom thereof are provided rollers (not shown) which are placed on the rails 1a and 1b. The main and subframes 2a and 2b are interconnected to each other by means of a girder 3 which extends in the X-direction. A main carriage 4a and a subcarriage 4b are slidably arranged on the girder 3 and are interconnected to each other by means of a coupling lever 5. At a right hand end of the lever 5 a photoelectric tracer 6 is secured. At a left hand portion of the lever a gas torch assembly is provided which includes a plurality of gas torches 7a, 7b and 7c. It should be noted that an optical axis of the tracer 6 and an axis of each torch are aligned in the X-direction.

On the main frame 2a a Y-motor 8 is secured for driving the main frame 2a and thus the tracer 6 and the torches 7a to 7c in the Y-direction. A Y position detector 9 is also secured on the main frame 2a for detecting a position of the tracer 6 in the Y direction. Similarly on the main carriage 4a an X-motor 10 is secured for driving the carriages 4a and 4b and thus the tracer 6 and the torches 7a to 7c in the X-direction. Similarly an X position detector 11 is secured to the main carriage 4a for detecting a position of the tracer 6 in the X-direction. In the present embodiment each of the Y and X position detectors 9 and 11 is formed by a rotary encoder. It should be noted that any other type of position detector may be used.

The tracer 6 comprises a photoelectric sensor detecting a direction to be traced and a projector for projecting a light spot onto a template placed on a template table 12 for indicating a position which is currently being traced. in this manner the operator can know a position being traced by means of the light spot with respect to the pattern in the template.

Figure 2:
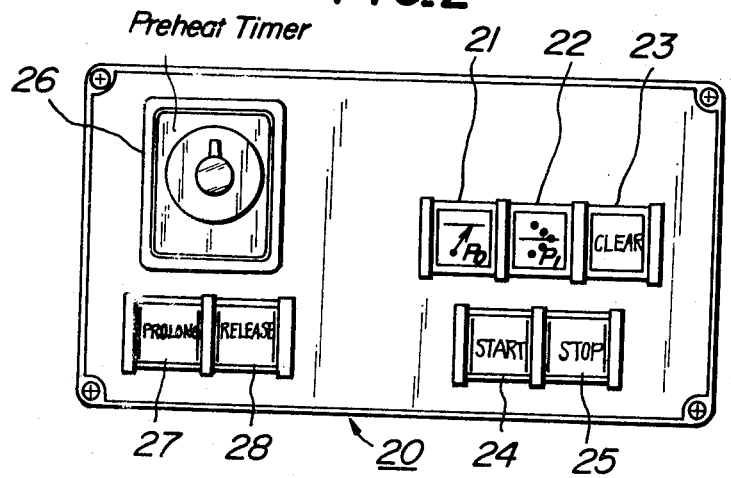
FIG. 2 is a plan view illustrating an embodiment of a control panel according to the invention.

FIG. 2 shows an embodiment of a control panel 20 for storing coordinates of operational points such as piercing point, copy start point, copy end point, etc. The control panel 20 may be provided at a suitable position on the main frame 2a or may be arranged at a position remote from the copying apparatus. In the latter case the control panel may be electrically connected to the copying apparatus through a cable. In this embodiment the control panel 20 comprises a piercing point presetting switch, i.e., a push button 21, a copy start point presetting switch 22, a clear switch 23, a start switch 24 and a stop switch 25. The control panel 20 further comprises a manually operable timer of a dial type 26 for presetting a preheating time, a switch 27 for prolonging a preheat time and a timer release switch 28 for ending the preheating within the preset preheat time. Functions of each of these switches will be described in later.

Figure 3:
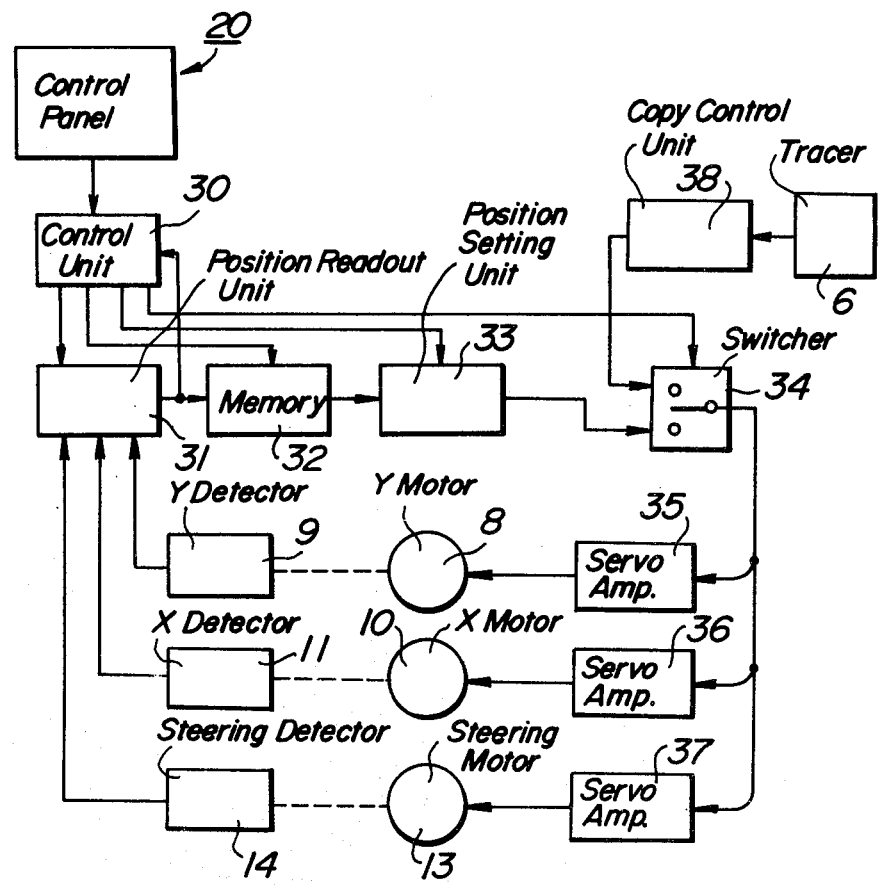
FIG. 3 is a block diagram depicting an embodiment of an electric circuitry for controlling the operation of the copying machine.

FIG. 3 is a block diagram illustrating an embodiment of an electric circuitry for controlling the operation of the copying apparatus according to the invention. In FIG. 3 the above mentioned Y motor 8, Y position detector 9, X motor 10 and X position detector 11 are shown. The control circuitry further comprises a steering motor 13 for driving a sensor head provided in the tracer 6 and a steering angle detector 14 for detecting a steering direction. The outputs from the control panel 20 are connected to a control unit 20 and outputs from the detectors 9, 11 and 14 are connected to a position detecting unit 31 which produces X and Y coordinates of the tracer 6 and angle information of the tracing direction. During a preparatory operation positional information at respective positions is stored in a given storing position of a memory 32 under the control of the control unit 30. During the actual working operation the information stored in the memory 32 is readout into a position setting unit 33 under the control of the control unit 30 and is processed therein to generate information about the trajectory to be followed by the tracer 6. The information thus formed is supplied to servo amplifiers 35, 36 and 37 by means of a switching unit 34 which is controlled by the control unit 30. The servo amplifiers 35, 36 and 37 generate motor driving signals for the motors 8, 10 and 13, respectively to move the tracer 6 along a predetermined path and to direct the sensor head of the tracer into a predetermined direction. While the tracer 6 traces the pattern on the template, the output signal from the tracer 6 is supplied to a copy control unit 38 an output signal is supplied to the servo amplifiers 35, 36 and 37 through the switching unit 34.

Figure 4:
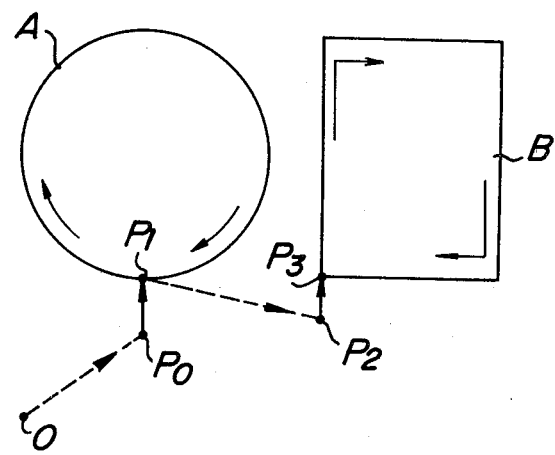
FIGS. 4 and 5 are plan views illustrating patterns to be traced by a tracer for explaining the operation of the control system according to the invention.

The successive operations and functions of the copying apparatus will be explained with reference to copying patterns shown in FIG. 4.

According to the invention prior to the actual working operation the tracer 6 is manually moved with respect to the patterns to be traced and coordinates of operational points such as piercing point, copy start point and copy end point are previously stored in the memory 32. In FIG. 4 a point O denotes an origin of X-Y coordinate system. Initially the tracer 6, has its optical axis preset at position O and Y and X up-down counters provided in the position readout unit 31 are reset to zero count. Then the tracer 6 is manually moved to a first piercing point $P_0$ and X and Y coordinates thereof are detected by the position readout unit 31. After it is confirmed that the light spot from the tracer 6 impinges upon the desired piercing point $P_0$ the piercing point presetting switch 21 on the control panel 20 is depressed. Then the X and Y coordinates readout by the unit 31 at this instance are transferred to the memory 32 and are stored in a given address position thereof together with information denoting that the point defined by the coordinates is a piercing point. In this manner according to the invention the piercing point $P_0$ can be set at any desired position with taking into account the shape and material or property of the object to be worked.

Next the tracer 6 is moved to a copy start point $P_1$ for a first pattern A, in this case a circle. The copy start point presetting switch 22 on the control panel 20 is depressed to store X and Y coordinates of the related start point $P_1$ in the memory. At the same time a tracing direction is denoted by manually operating a steering handle provided on the tracer 6 to direct the tracer in a given direction. At this time the output from the angle detector 14 is read out by the unit 31 and the angle information is stored in the memory 32. In the instant example the pattern A is to be traced in the clockwise direction as shown by an arrow in FIG. 4.

Next the tracer 6 is moved to a second piercing point $P_2$ for a second pattern B and the piercing point preset switch 21 is actuated to store X and Y coordinates of the second piercing point $P_2$ in the related address position of memory 32. Further the tracer 6 is moved to a copy start point $P_3$ for this pattern B and X-Y coordinates of this point $P_3$ and the angle information for denoting the copying direction are stored in the memory 32. In this example the pattern B is also to be traced in the clockwise direction. Since both the patterns A and B are closed patterns, i.e., those which can be described by one stroke and the tracer 6 will trace the patterns along closed paths or trajectories it is not necessary to preset any copy end point. That is to say when the tracer 6 will return the copy start point, it can be detected that the copying operation for the pattern has been completed. If erroneous coordinates are stored in the memory, they may be erased by operating the clear switch 23 on the control panel 20. That is, upon actuating the switch 23 the last coordinates in the memory 32 can be removed.

After the preparatory operation has been finished as described above an actual working may be started. In the case of cutting an object by means of the cutting gas torches 7a to 7c it is necessary to preheat the object at the piercing point. In general the preheating time may vary dependent upon many factors such as thickness and material of the object, strength of preheating burn or hurt, and it is difficult to determine one preheating time for all cases. In the present embodiment the preheating time may be predetermined at will by presetting the preheat timer 26 on the control panel 20. As will be explained herein the timer is actuated automatically when the tracer 6 reaches the piercing points $P_0$ and $P_2$. Further the preheating time may be prolonged or shortened by operating the prolong switch 27 and release switch 28, respectively.

Upon initiation of the actual working operation the tracer 6 is first set at the origin O and the start switch 24 on the control panel 20 is depressed. Then the X and Y coordinates of the first piercing point $P_0$ are readout from the memory 32 into the position setting unit 33. In this case since the switching unit 34 has been switched into a position setting mode the tracer 6 is moved automatically to the first piercing point $P_0$ at a high speed, e.g. 3,000 mm per minute. The position of the tracer 6 at any particular instance is always detected by the position detecting unit 31. When the tracer 6 arrives at the first piercing point $P_1$ it is stopped thereat. Then the preheat timer 26 on the control panel 20 is actuated by a command from the position setting unit 33 and the preheating gases are ejected from the torches 7a to 7c. Immediately before the preheating time has been finished, the cutting oxygen gas flows are jetted to form a hole in the object at the given piercing point $P_0$. When the control unit 30 detects the completion of the preheating cycle, the X and Y coordinates of the first copy start point $P_1$ are read out from the memory 32 into the position setting unit 33 which then generates a signal for moving the tracer 6 to the first copy start point $P_1$ at a predetermined cutting speed (50~1,250 mm/minute). During this movement the steering angle data related to the point $P_1$ is also read out from the memory 32 to drive the steering motor 13 to set the sensor head of the tracer into the predetermined direction.

When it is detected that the tracer 6 has reached the first copy start point $P_1$, the control unit 30 sends a command to the switching unit 34 which is then switched into the copying mode. Thereafter the tracer 6 follows the contour of first pattern A under the control of the copy control unit 38 to cut the object into a shape corresponding to that of the pattern A.

In this manner the tracer 6 traces the pattern A in the clockwise direction and returns to the first start point $P_1$. When this point is detected, the ejection of the cutting oxygen flow is stopped. It should be noted that the tracer 6 could not return to the point $P_1$ in an extremely accurate manner, but might deviate therefrom to a slight extent. Even in such a case the completion of the copying operation for the pattern A has to be detected. For this purpose an error window with a center at the point $P_1$ and having a suitable size has been predetermined taking into account a width of a cut line, accuracies of various portions, etc. In practice the error window may be a sequence having a side length of 0.5 to 1.5 mm. When the optical axis of the tracer 6 enters such an error window, it can be judged that the tracer 6 has returned to the start point $P_1$. Then the cutting oxygen flow is stopped and the switching unit 34 is changed again into the position setting mode.

Next the coordinates of the point into which the tracer 6 should move are read out from the memory 32 into the position setting unit 33 under the control of the control unit 30. In this example the coordinates of the second piercing point $P_2$ for the second pattern B are read out. The position determining unit 33 judges that the readout coordinates of the point $P_2$ belong to the piercing point and generates a signal for moving the tracer 6 into the point $P_2$ at high speed.

When the control unit 30 detects that the tracer 6 has arrived at the second piercing point $P_2$, it actuates the preheat timer 26 as described above with respect to the first piercing point $P_1$ to generate the preheating gases from the torches 7a to 7c for a given preset time period. At almost the end of this time period the cutting oxygen flows are again ejected from the torches to effect the piercing.

Upon the completion of the preheating preset by the timer 26 the coordinates of the copy start point $P_3$ for the pattern B is readout from the memory 32 into the position setting unit 33 and the tracer 6 is moved to this point $P_3$ at the cutting speed. When the arrival of the tracer 6 at the point $P_3$ is detected, the control unit 30 switches the switching unit 34 into the copying mode. Then the tracer 6 is driven by the signal from the copy control unit 38 to cut the object in accordance with the second pattern B. When the tracer 6 returns to the copy start point $P_3$, the ejection of cutting oxygen is stopped.

As explained above, according to the invention the actual working operation can be started merely by actuating the start switch 24 and then the tracer 6 is automatically moved along the predetermined path to cut the object in accordance with the pattern. Therefore working efficiency is improved to a great extent. Further the usual templates can be used as they are and thus the control for the copying apparatus can be carried out in a very inexpensive manner. Moreover the operation points such as piercing point and copy start point can be preset at will in the actual working place, so that the special skill of experienced operators can be adopted or utilized in the actual working and the very efficient and accurate copying and working can be achieved.

Figure 5:
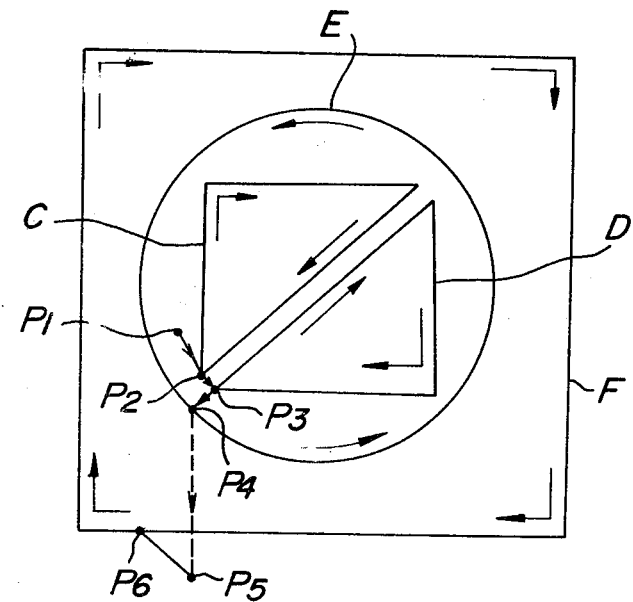

FIG. 5 shows another example of a path to be traced by the tracer 6 in the case of effecting the copying and working for a plurality of patterns C to F. Two patterns C and D are triangles, a pattern E a circle and a pattern F is a square. In this case three workpieces, i.e., two triangular pieces and one rectangular piece with a circular opening are to be formed. Therefore the cutting operation is effected from a point $P_1$ situated inside the circular pattern E, but outside the triangular patterns C and D. At first the tracer 6 is moved into the first piercing point $P_1$ and its X and Y coordinates are stored in the memory 32 by actuating the piercing point presetting switch 21. Then coordinates of a copy start point $P_2$ for the pattern C, a copy start point $P_3$ for the pattern D and a copy start point $P_4$ for the pattern E are successively stored in the memory 32, while moving the tracer through these points. Next coordinates of a second piercing point $P_5$ and a copy start point $P_6$ for the pattern F are stored in succession.

In the actual working operation the tracer 6 is moved from the origin to the first piercing point $P_1$ at the high speed and then the preheat timer 26 is actuated to effect the piercing. After that the tracer 6 is moved toward the copy start point $P_2$ at the cutting speed. When the tracer 6 is detected to reach the point $P_2$, the switching unit 34 is switched in the copy mode. Then the tracer 6 moves along the pattern C in the clockwise direction and arrives again at the start point $P_2$. Then the switching unit 34 is switched into the position setting mode. At the same time the coordinates of the point $P_3$ towards which the tracer 6 should be moved are read out from the memory 32 into the position setting unit 33 in which this point $P_3$ is determined as a copy start position. In this case the tracer 6 is moved into the start point $P_3$ without stopping the cutting oxygen flow.

When the tracer 6 arrives at the position $P_3$, the copying mode is again selected and the copying and working is carried out along the contour of the pattern D. After full tracing along the closed pattern D the tracer 6 again reaches point $P_3$ and the position setting mode is again selected. Then the tracer 6 is moved towards the next copying start point $P_4$ at the cutting speed. When the tracer arrives at point $P_4$, the switching unit 34 is again set in the copying mode and the copying and working is effected in accordance with the pattern E. When the tracer returns to point $P_4$, the switching unit 34 is switched into the position setting mode.

At the same time the coordinates of the point $P_5$ towards which the tracer 6 should be moved are read out from the memory unit 32 into the position setting unit 33 which detects that this point $P_5$ has been stored as the piercing point. Therefore the ejection of the cutting oxygen flow is temporarily stopped and the tracer 6 is moved to the piercing point $P_5$ at the high speed. After the tracer 6 reaches the point $P_5$, the piercing is started to form a hole in the object at piercing point $P_5$. After preheating has been finished the tracer 6 is moved at the cutting speed to the copying start point $P_6$ for the pattern F. When the tracer arrives at the point $P_6$, the copying mode is again selected and the working along the pattern F is performed.

As explained above according to the invention the working machine can be moved from a pattern to another pattern with or without effecting the continuous cutting operation at the low or high speed. The copying apparatus can be automatically controlled in the above mentioned manner by detecting to what kind of functional point does a point to which the tracer should be moved belong. Therefore during the preparation period it is not necessary to store a control command about the cutting oxygen flow, the tracer travelling speed, etc. Of course it is also not required for the operator to set these instructions during the actual working.

Figure 6:
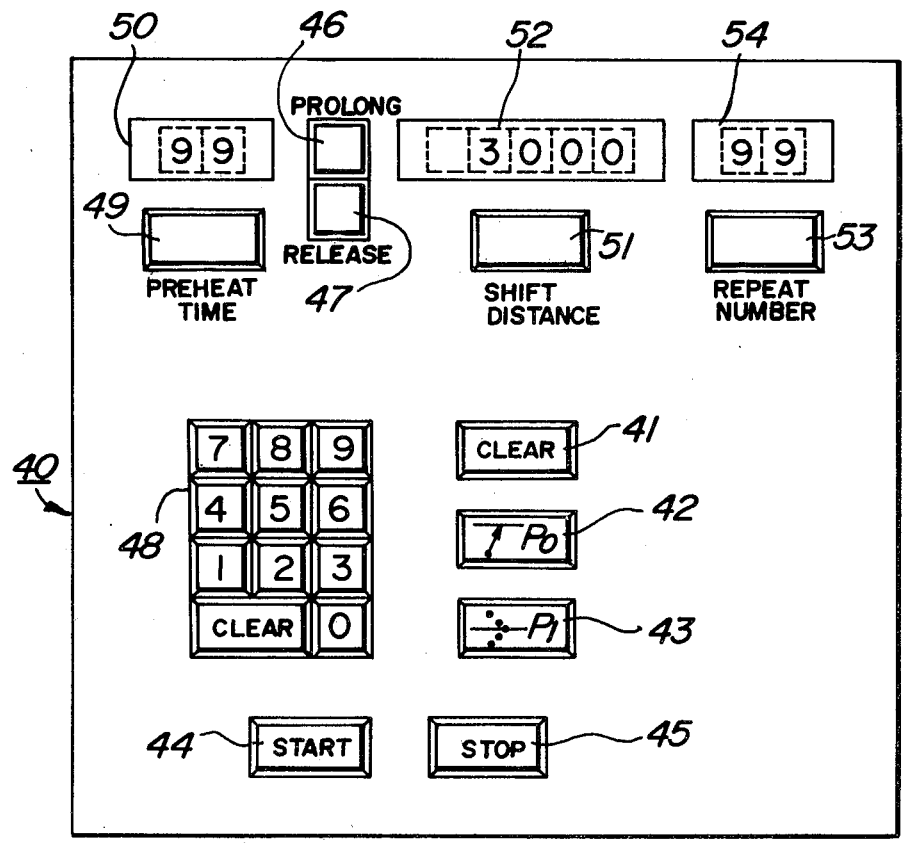
FIG. 6 is a plan view showing another embodiment of the control panel according to the invention.

FIG. 6 is a plan view showing another embodiment of the control panel according to the invention. A control panel 40 of this embodiment comprises a clear switch 41, a piercing point presetting switch 42, a copy start point presetting switch 43, a start switch 44, a stop switch 45, a preheat time prolonging switch 46 and a preheat timer releasing switch 47 which are the same as those in the preceding embodiment shown in FIG. 2. In the present embodiment in order to preset the preheating time in a digital manner instead of the dial a numerically presetting button device 48 having ten keys and a clear button is provided. After the preheat time presetting switch is depressed it is possible to preset any preheat time up to 99 seconds by operating the numerically presetting button device 48. The preheat time thus preset is displayed in the preheat time display unit 50.

Figure 7:
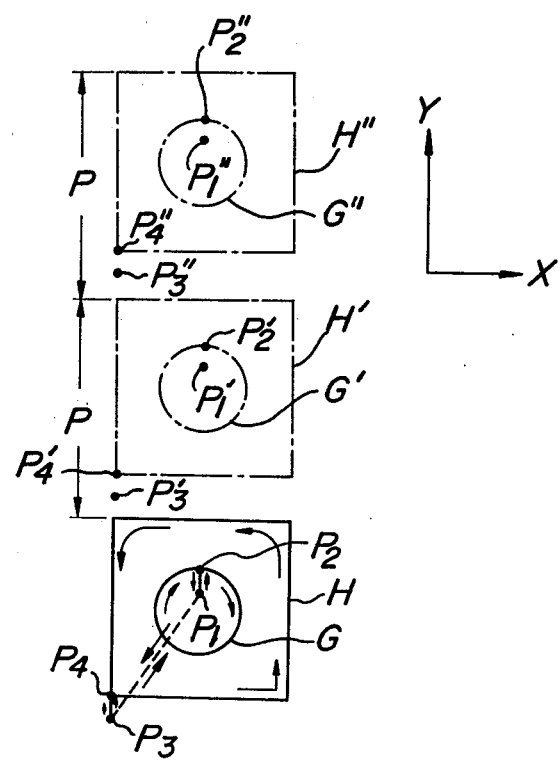
FIG. 7 is a plan view illustrating patterns for explaining a repetitive copying operation according to the invention.

The control panel of this embodiment functions for repeating the copy-working along the same pattern as will be explained hereinafter with reference to FIG. 7. For this purpose the table 12 (FIG. 1) on which a template is to the placed is arranged movably in the Y direction. Now it is assumed that a copy working in accordance with two patterns G and H shown in FIG. 7 is effectuated repeatedly. Prior to the working operation a piercing point $P_1$ and a copy start point $P_2$ for the first pattern G and a piercing point $P_3$ and a copy start point $P_4$ for the second pattern H are stored successively as explained above. In the case of repeating the copy-working it is necessary to return the tracer 6 to the initial point $P_1$ after the first copy-working. Thus the tracer 6 traces the following path.

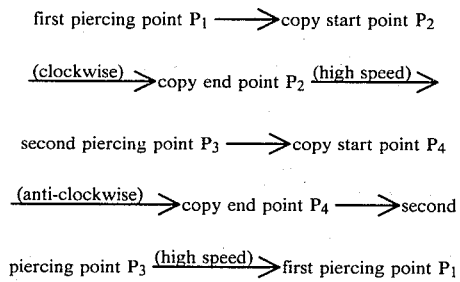

After the first copy-working has finished the patterns G and H, i.e., the template on which these patterns are described is moved in the Y direction by a distance P and then the second copy-working is effected for thus shifted patterns G' and H'. In this case the tracer 6 has to be also shifted in the Y direction by the same distance P. This distance P can be reset by means of the control panel 40 shown in FIG. 6. To this end after a shift-distance presetting switch 51 has been depressed the desired distance P can be introduced by operating the numerically presetting button device 48 and then the distance P is displayed in a distance display unit 52. In response to the shift of the tracer 6 the coordinates of all points are shifted in the Y direction by the distance P at the start of the second copy-working. During the second copy-working the working operation is effected in accordance with the points $P'_1$ to $P'_4$ of the shifted patterns G' and H'. Further the number of repeating times can be preset by actuating a repeat number presetting switch 53. This repeat number can be displayed in a display unit 54. In this manner the copy-working operation can be repeatedly effected by the preset repeat number for the shifted patterns G, H; G', H'; G", H" . . . , while every time the table 12 and the tracer 6 are shifted by the distance P. In this embodiment since it is sufficient to store once the coordinates of all points for the patterns G and H during the preparation step the operation in the preparation is quite simple and the capacity of the memory 32 can be made smaller.

In the above embodiments of the invention the path to be traced by the tracer 6 is preset during the preparation step and the tracer is automatically controlled to follow the preset path. According to the invention several other functions can be additionally provided.

Figure 8:
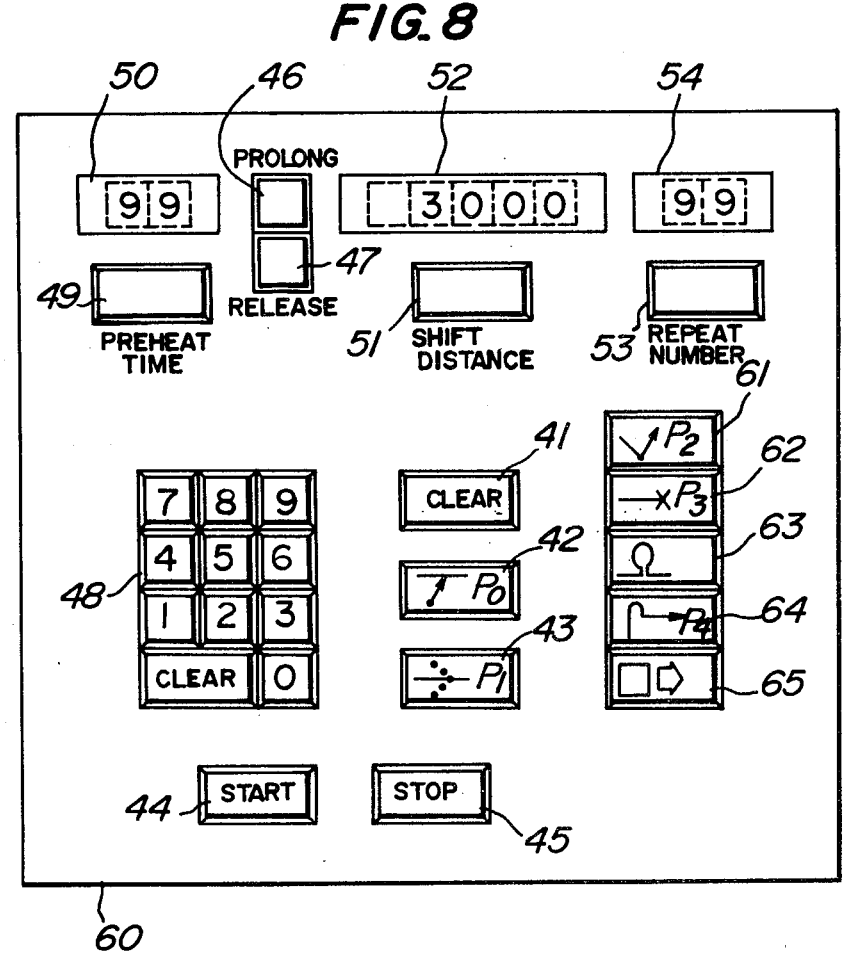
FIG. 8 is a plan view depicting still another embodiment of the control panel according to the invention.

FIG. 8 is a plan view illustrating another embodiment of the control panel which is provided with some additional functions. In FIG. 8 portions corresponding to those of FIG. 6 are denoted by the same reference numerals as those used in FIG. 6. In this embodiment an intermediate point presetting switch 61, a copy end point presetting switch 62, a continuous cutting switch 63, a slow down point presetting switch 64 and a stage changing switch 65 are provided in the control panel. Functions of these switches will be explained hereinafter.

Figure 9:
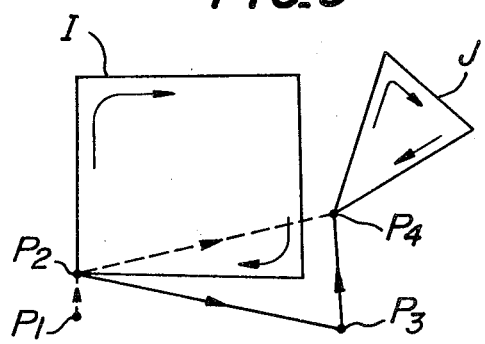
FIG. 9 is a plan view showing a pattern for explaining the operation of the control system according to the invention.

The intermediate point presetting switch 61 is used to preset a path to be traced by the tracer 6 when the tracer is moved from a pattern to a next pattern without interrupting the ejection of cutting oxygen flow. This will be explained in detail with reference to a case in which the copy-cutting should be effected continuously for two patterns I and J shown in FIG. 9. A piercing point and a copy start point for the pattern I are denoted by $P_1$ and $P_2$, respectively and a copy start point for the pattern J is indicated by $P_4$. If the tracer 6 is moved from the point $P_2$ to the copy start point $P_4$ of the second pattern J along a path shown by a broken line in FIG. 9 without interrupting the cutting oxygen flow after the copy-working for the first pattern I has been finished, the torch would travel over a workpiece which has been cut in the copy-working for the first pattern I and might injure the workpiece. Therefore the tracer could not be moved along the broken line. In such a case an intermediate point $P_3$ may be preset to store its coordinates in the memory by actuating the intermediate point presetting switch 61. It should be noted that the intermediate point $P_3$ is selected so that the tracer can bypass the pattern I. After the copy-working for the first pattern I has been completed the tracer 6 can be moved from the point $P_2$ to the point $P_4$ via the point $P_3$ without interrupting the ejection of cutting oxygen and the workpiece which has been formed by the copy-working for the first pattern I can be protected against the cutting oxygen flow. In this case since the intermediate point $P_3$ is not a piercing point for the second pattern J this point $P_3$ should be discriminated from the piercing point. To this end the intermediate point presetting switch 61 is provided separately from the piercing point presetting switch 42. In this manner the travelling of the tracer can be automatically controlled merely by presetting the coordinates of functional points in such a manner that the tracer is moved from a point to a next one with interrupting temporarily the cutting oxygen flow as when the second point has been set as the piercing point, while the tracer is moved at the cutting speed without interrupting the gas flow when the second point has been stored as the intermediate point.

The copy end point presetting switch 62 is used to preset and store coordinates of a copy end point. If a pattern to be traced could not be described with one stroke, the copying operation has to be interrupted at one or more given positions and then the copying operation is started again from one or more separate positions. In the preparation step if coordinates of a given point are stored as the copy end point by actuating the copy end point presetting switch 62, in the actual working when the tracer reaches this point the copying operation is interrupted and the switching unit 34 is switched into the position setting mode. If a piercing point has been preset between the copy end point and a next copy start point, the ejection of cutting oxygen is automatically interrupted at the copy end point and then the tracer 6 is moved to the next point at the high speed. It should be noted that this next point is not always the piercing point. On the contrary if the next copy start point has not been stored as the piercing point, the tracer is moved to this point at the cutting speed without interrupting the oxygen flow.

In the repetitive copying operation which has been explained with reference to FIG. 7 the ejection of the cutting oxygen is interrupted during the travelling of the table 12 and tracer 6 in the Y-direction to successive positions. However depending upon a pattern to be traced it is preferable not to interrupt the cutting gas flow. For this purpose the control panel 60 has a continuous cut switch 63. As long as the switch 63 is depressed the cutting oxygen flow is not interrupted even after the copy-working has been finished and the tracer and table are moved in the Y-direction by the distance P at the cutting speed.

If a pattern has a sharp corner or use is made of a high speed plasma cutting, it is sometimes required to slow down the cutting speed just before the corner. To this end a slow down switch 64 is provided. In the preparation step the tracer 6 is positioned at a point from which the cutting speed should be decreased and then the slow down point presetting switch 64 is actuated to store the coordinates of this point as a slow down start point. In the actual working when the tracer is detected to arrive at this point, the cutting speed is deccelerated at a predetermined rate from this point. When a predetermined speed has been reached, the cutting speed is accelerated again at a predetermined rate to the ordinary cutting speed. In this manner the cutting speed can be automatically decreased at the sharp corner to increase the working accuracy. In the above embodiment only the deccelerating point just in front of the corner is preset, but an accelerating point may be also preset, if any. In this case the tracer may trace the corner at the predetermined low speed and then its moving speed is increased from the accelerating point beyond the corner.

In the embodiment shown in FIG. 7 the shift distance P of the pattern in the repetition mode is fixed to a constant length. But in some cases it is desirable to effect the repetitive copy-working at different position of an object. In such a case it is necessary to move the template table 12 to given positions to alter or change a cutting stage. In this case if the table 12 and thus the tracer 6 is moved, the coordinates of the tracer might be changed arbitrarily and thus it is impossible to effect the control with using the previously stored coordinates of the points as they are. In order to avoid such an inconvenience the origin O of X-Y coordinates may be shifted by actuating the stage changing switch 65. When this switch 65 is depressed, the amount of shift of the tracer 6 could not be detected by the position detecting unit 31. In this manner the origin of X-Y coordinates may be manually shifted into any desired position.

The invention is not limited to the embodiments explained above, but many modification can be conceived within the scope of the invention. For example, in the above embodiments the present invention is described as being applied to the control for the copy-cutting machine, but may be also applied to other copying apparatus such as a copy-welding machine, and a copy-lathing machine. In the above embodiments the position setting unit 33 discriminates the kinds of the stored points to produce the signals for controlling the interruption of the cutting oxygen flow, the travelling speed, etc., but the present invention should not be limited to such embodiments. According to the principal concept of the invention it is sufficient to control the tracer in such a manner that it atuomatically travels along the predetermined path. In the above copying apparatus the tracer and the gas torch, i.e., the working machine are related to each other in the relationship of one-to-one, but may be related differently therefrom.

The advantages according to the present invention may be summarized as follows:

(1) Since any guide line for guiding the tracer from the piercing line to the copy start point the ordinary templates can be used as they are and thus the copy-working can be carried out in an economical manner.

(2) After the operation points have been stored it is sufficient for the operator to actuate the start switch and the operator is not necessary to watch the operation of copying machine during the working step. Therefore the operation becomes quite simple and the working efficiency becomes very high.

(3) As compared with the numerical control system the control method according to the invention is rather simple and can be carried out into effect in an inexpensieve manner.

(4) The operational points such as the piercing point, the copy start point, etc. may be simply preset in the actual working place and during this presetting operation the skill of experienced person can be adopted to a great extent.

(5) By discriminating the kinds of operational points it is possible to provide the functions for applying the command signals with respect to the travelling speed, the operation of the working machine, etc. as well as the command signals for the travelling of tracer. In this manner the operation efficiency can be further enhanced.

What is claimed is:

1. A method of controlling the operation of a copying apparatus which includes a tracer for tracing automatically a contour of a pattern to be copied and a working machine having a working head movable in conjunction with the tracer in a given relationship for effecting a given working operation for an object to be worked comprising the steps of;

prior to an actual working operation;

moving the tracer manually with respect to the pattern to be traced to detect coordinates of the tracer at respective operational points which include at least a working start point, a copy start point, and a copy end point, and storing the coordinates thus detected in a memory;

and during the actual working operation;

reading the stored coordinates from the memory to control automatically the movement of said tracer in such a manner that until the tracer reaches a copy start point the copying apparatus is set in a position setting mode in which the tracer is moved under the control of the readout coordinates, and after the tracer has reached the copy start point the copying apparatus is switched into a copying mode in which the movement of said working head is controlled by the movement of the tracer which follows the pattern.

2. A method according to claim 1, wherein the pattern is that which can be described with one stroke and the copy start point is also used as the copy end point and when the tracer returns to the copy start point, the copying apparatus is automatically switched into the position setting mode.

3. A method according to claim 2, wherein the return of the tracer to the copy start point is detected in such a manner that the tracer enters into an error window having a center at the copy start point and a predetermined size.

4. A method according to claim 1, wherein the pattern to be traced is shifted with respect to the copying apparatus by a given distance and the working operation for the object in accordance with the pattern is repeated at respective shifted positions.

5. A method according to claim 4, wherein said given distance is preset prior to the actual working operation.

6. A method according to claim 5, wherein the coordinates of the operational points stored in the memory are automatically shifted by the preset distance.

7. A method according to claim 1, wherein a command signal for denoting a direction of the copying movement is previously stored in the memory in relation to the coordinates of the copy start point prior to the actual working operation and the command signal thus stored is read out during the actual working operation to control the direction of copying movement of tracer at the copy start point.

8. A method according to claim 1, wherein an origin of the coordinates is shifted with respect to the object during the actual working operation so that the same working operation is repeatedly effected in separate regions of the object.

9. A method according to claim 1, wherein prior to the working operation command signals for denoting an operation of the working machine at the operational points and during the movement between the successive operational points are stored in the memory in relation to the coordinates at the operational points; and during the actual working operation the command signals are read out from the memory together with the coordinates of the related points to control automatically the operation of the working machine.

10. A method according to claim 9, wherein during the actual working operation the movement of the tracer and the operation of working machine are controlled in accordance with the read out coordinates and command signals.

* * * * *